June 24, 1924.

L. MASTRANGEL

SHOCK ABSORBER

Filed May 9, 1923

1,499,179

INVENTOR.
LOUIS MASTRANGEL

BY Stockbridge & Borst
ATTORNEYS

Patented June 24, 1924.

1,499,179

UNITED STATES PATENT OFFICE.

LOUIS MASTRANGEL, OF WEST HOBOKEN, NEW JERSEY.

SHOCK ABSORBER.

Application filed May 9, 1923. Serial No. 637,628.

*To all whom it may concern:*

Be it known that I, LOUIS MASTRANGEL, a citizen of the United States, residing at West Hoboken, in the county of Hudson and State of New Jersey, have invented certain new and useful Improvements in Shock Absorbers, of which the following is a full, clear, and exact description.

This invention relates to shock absorbers for vehicles, of the type embodying a casing with a frusto-conical seat and a rotary brake element therein with a frusto-conical bearing surface nesting in the seat. With this type of device it is necessary that resilient means be provided for maintaining the braking element in contact with its seat, with the desired degree of pressure. Prior devices of this type have utilized flat or leaf springs for supplying this pressure, but they have been unsatisfactory because when the braking elements moves further into the seat as the parts become worn, the leaf spring quickly looses its stress and fails to exert the necessary pressure upon the braking element. In prior devices the braking element has been mounted for rotation only in one wall of the casing, and consequently it soon enlarges the opening of the casing through which it passes, due to wear, with the result that a lubricant packed in the casing leaks out.

An object of this invention is to provide an improved shock absorber of this type which will automatically compensate for wear on the frictional bearing surface without materially lessening the pressure between the surfaces; with which the lubricant will not leak out due to wearing of the bearings; and with which the pressure between the surfaces may be varied as desired. A further object is to provide an improved shock absorber of this type which is exceptionally simple, compact, durable and inexpensive. Other objects and advantages will be apparent from the following description of an embodiment of the invention, and the novel features will be particularly pointed out hereinafter in claims.

Figure 1:
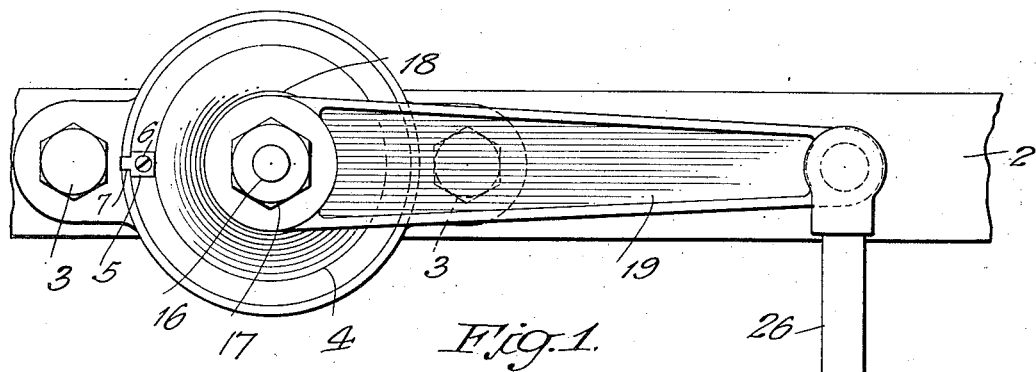
Fig. 1 is an elevation of a portion of a vehicle having thereon a shock absorber constructed in accordance with the invention.
Figure 2:
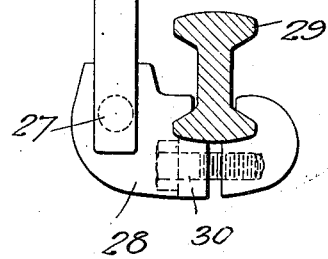
Fig. 2 is a sectional plan through the same.

Referring particularly to the embodiment illustrated in Figs. 1 and 2 a casing 1 is adapted to be secured to the chassis frame 2 of a vehicle, in any suitable manner such as by bolts or screws 3 which pass through flanges extending peripherally of the casing. A closure 4 is threaded into the open face of the casing, and may be locked in closed position in any suitable manner, such as by a lug 5 which is clamped to the closure by a screw 6 in a position to enter a slot 7 in the edge surrounding the open face of the casing and lock the closure against rotation. The casing is provided in its interior with a frusto-conically shaped bearing seat 8, in which a lining band 9 of a suitable friction material, such as fiber, is nested. A shaft 10 passes through the interior of the casing between the closure 4 and the opposite side wall of the casing, and has a reduced end 11 rotatably mounted in a recess 12 in the wall of the casing opposite the closure 4. The shaft 10 has a reduced portion 13 which passes through an aperture 14 in the closure 4, and a further non-circular reduced portion 15 which extends outwardly beyond the closure 4. A still further reduced portion 16 of the shaft 10 is threaded, and carries thereon a nut 17 and washer 18. A crank arm 19 is provided at one end with an aperture 20 which corresponds in shape and size to the periphery of the reduced portion 15 of the shaft, and fits over the same, so that the crank arm and shaft will rotate together. The crank arm is confined to the non-circular portion 15 of the shaft by the nut 17 and washer 18. The shoulder between the portion of the shaft 10 within the casing and the reduced portion 13 which passes through the closure, is adapted to engage against the inner face of the closure and prevent withdrawal of the shaft 10 from the casing through the opening in the closure. The shaft 10 is provided with a non-circular enlarged portion 21, immediately adjoining the reduced portion 11, and a braking element 22 fits over the enlarged portion 21 of the shaft. The brake element has an aperture 23 which corresponds substantially in shape and size to the periphery of the enlarged portion 21 of the shaft, except that the aperture 23 is slightly larger than the periphery of the enlarged portion 21 so that there will be a slight amount of lost motion between them. Because of the non-circular aperture 23 and the non-circular periphery of the enlarged portion 21, the shaft and brake element will rotate together, and at the same time the brake element will be free to slide axially of the shaft. The periphery of the brake element 22 is frusto-conical and nests within the friction lining 9 and frusto-conical seat of the case. A coil spring 24 is compressed between the brake element 22 and the closure 4, and exerts a yielding pressure upon the brake element in a direction tending to carry it more firmly into engagement with the lining 9. The inner face of the closure 4 may be, and preferably is, provided with a washer 25 which is secured in any suitable manner, against rotation relatively thereto, and the coil spring, at its outer end, is adapted to bear against this washer, which is preferably of hardened steel or other suitable hardened material, so that any wear between the spring and closure will occur in the washer, which can be readily replaced. The turns of the spring 24 are preferably of progressively different diameters so as to be frusto-conical in shape, and the coil is placed within the casing with the large base abutting against the brake element 22, and the small base abutting against the washer 25 of the closure. With such a coil the turns will clear one another when compressed into a single plane.

The crank arm 19 is attached by a universal connection to one end of a link 26, and the latter on its other end is pivotally connected, as at 27, to a bracket 28 which may be secured to the axle 29 of the vehicle. The bracket 28 is preferably formed of two sections which are secured together and against opposite faces of the axle by one or more screws 30.

In the operation of the shock absorber illustrated in Figs. 1 and 2 and hereinbefore described, the casing is connected to the chassis frame, and the bracket 28 to the axle. As the vehicle moves over the roadway, the unevenness of the roadway will cause the axle and chassis frame to move toward and from one another to an extent permitted by the springs of the vehicle. During these relative movements of the axle and chassis frame, the crank arm 19 will be oscillated and through its connection to the shaft 10 and the latter's connection to the brake element 22, the brake element will be oscillated. This oscillation will be resisted by the friction lining 9 of the bearing seat in the casing. During the minor relative movements between the chassis frame and axle only a slight movement of the crank arm 10 will result, and owing to the slight lost motion between the braking element and the shaft, the brake element will not be oscillated. Therefore, the only resistance to these relative movements between the axle and shaft, will be that due to the supporting springs between them. When, however, the chassis frame and axle partake of the major relative movements, such as when bumps or sharp undulations in the roadway are encountered, the brake element 22 will be resisted by the friction between the brake element and the lining of the casing. This effectively serves to check the excessive or major relative movements between the chassis frame and axle. As the lining 9 becomes worn, the spring 24 will automatically shift the brake element further into the frusto-conical seat, so as to compensate for the wear of the lining, and since a coil spring is utilized, the slight expansion which is caused by the movement of the brake element against the lining, will not materially lessen the stress existing in the spring.

Figure 3:
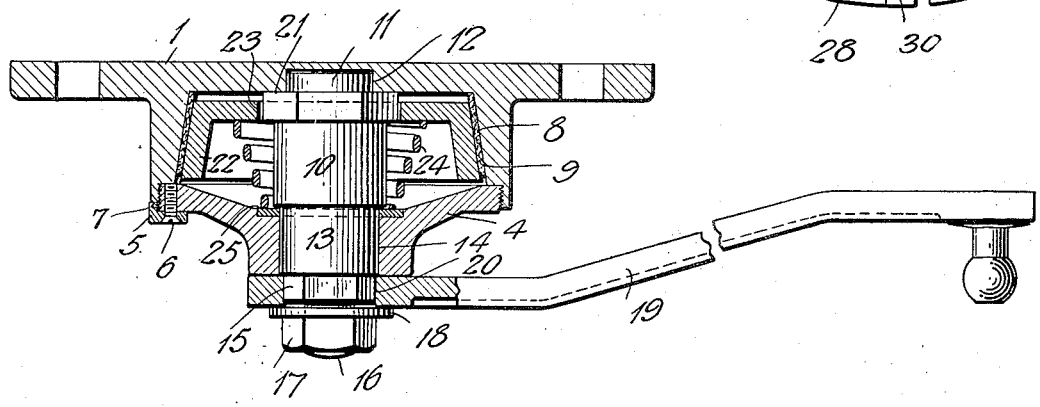
Fig. 3 is a sectional plan through a slightly modified construction of shock absorber.

In the embodiment illustrated in Fig. 3, the closure 4ª is provided with a sleeve 31 which is threaded through the central aperture 14ª thereof. The sleeve may be held in different adjusted positions within the closure in any suitable manner such as by a set screw 32. The sleeve is provided upon its inner end with a washer 25 of hardened material for engaging with the coil spring, and preventing wear when relative movement occurs between the spring and the sleeve. The shaft 33 corresponds in function to the shaft 10, and is provided with a non-circular enlarged portion 34, corresponding to the enlarged portion 21 of the embodiment shown in Figures 1 and 2, over which the brake element 22 is somewhat loosely disposed. The shaft 33 is provided at its inner end with a recess 35 which fits over and rotates upon a bearing pin 36 affixed to and projecting from the inner face of the side wall of the casing opposite the closure. The shaft 33 may be held against axial movement in any suitable manner, such as by pins 37 which extend inwardly from the shaft and engage in an annular groove 38 provided upon the periphery of the pin 36. In this embodiment the spring 24 may be compressed to various extents, for varying the pressure between the frictional bearing surfaces, by adjusting the sleeve 31 to various extents through the aperture 14ª of the closure 4ª. The operation otherwise is similar to that described in connection with the embodiment shown in Figs. 1 and 2.

The interior of the casing may be packed with a suitable lubricant, and since, in both embodiments, the shaft has a bearing at opposite sides of the casing, there will be no uneven wear on the bearing surfaces, and consequently no likelihood of leakage of the lubricant through worn bearings. The coil spring will produce a substantially constant pressure between the friction surfaces, and automatically compensate for considerable wear between the surfaces without materially affecting the pressure which it creates between the surfaces.

It will be obvious that various changes in the details and arrangements of parts herein described and illustrated for the purpose of explaining the nature of the invention, may be made by those skilled in the art within the principle and scope of the invention as expressed in the appended claims.

Claims:

1. A shock absorber for vehicles, comprising a casing adapted for connection to one of two relatively moving parts whose movement is to be checked, and having a frusto-conical seat, a shaft extending through and rotatably carried by the casing, a brake element within the casing and connected to said shaft for rotation therewith and slidable therealong, said element having a frusto-conical periphery fitting in and having frictional bearing with the frusto-conical seat of the casing, a coil spring acting between the said element and a wall of the casing for stressing said element yieldingly into the frusto-conical seat, an arm fixed to said shaft, and means for connecting said arm to the other of the two relatively moving parts.

2. A shock absorber for vehicles, comprising a casing adapted for connection to one of two relatively moving parts whose movement is to be checked, and having a frusto-conical seat, a rotary shaft extending through the interior of the casing and having bearings in opposite walls of the casing, a brake element within the casing and connected to said shaft for rotation therewith and slidable therealong, said element having a frusto-conical periphery fitting in and having frictional bearing with the frusto-conical seat of the casing, a coil spring acting between the said element and a wall of the casing for stressing said element yieldingly into the frusto-conical seat, an arm fixed to said shaft, and means for connecting said arm to the other of the two relatively moving parts.

3. A shock absorber for vehicles comprising a casing having a frusto-conical bearing seat, and a removable closure forming one side wall of the casing, said closure having a bushing adjustable therethrough to different extents, a shaft passing through and rotating in said bushing and also rotatably supported by the opposite side wall of the casing, a brake element within the casing and connected to said shaft for rotation therewith and slidable therealong, said element having a frusto-conical periphery nesting in and having frictional bearing in said seat, a coil spring acting between the bushing and said element for stressing the element yieldingly against the said seat whereby adjustment of the bushing through the closure will vary the pressure of the element against its seat, and an arm fixed on the shaft whereby when the arm and casing are connected to two relatively moving parts, the relative movement will be resisted by the friction of the element in said seat.

4. The shock absorber for vehicles substantially as set forth in claim 1, in which the turns of the coil spring vary progressively in diameter so as to be compressible substantially into a single plane without interference between the different turns.

In witness whereof, I hereunto subscribe my signature.

LOUIS MASTRANGEL.